United States Patent
Kobari (10) Patent No.: US 8,425,625 B2
(45) Date of Patent: Apr. 23, 2013

(54) CRYSTALLIZATION METHOD AND CRYSTALLIZATION APPARATUS

(75) Inventor: Masanori Kobari, Yokohami (JP)

(73) Assignee: JGC Corporation, Tokyo (JP)

( * ) Notice: Subject to any disclaimer, the term of this patent is extended or adjusted under 35 U.S.C. 154(b) by 331 days.

(21) Appl. No.: 12/957,122

(22) Filed: Nov. 30, 2010

(65) Prior Publication Data

US 2011/0138581 A1   Jun. 16, 2011

(30) Foreign Application Priority Data

Dec. 11, 2009   (JP) ................. 2009-281654

(51) Int. Cl.
   *B01D 9/00*   (2006.01)
(52) U.S. Cl.
   USPC ..................... 23/295 R; 422/245.1
(58) Field of Classification Search ............... 23/295 R, 23/296, 300, 301; 422/245.1, 608
   See application file for complete search history.

(56) References Cited

U.S. PATENT DOCUMENTS

2001/0011520 A1   8/2001   Ooshima et al.

FOREIGN PATENT DOCUMENTS

| DE | 10 2006 060117 A1 | 6/2008 |
|---|---|---|
| GB | 935432 A | 8/1963 |
| JP | 2007-313484 | 12/2007 |

OTHER PUBLICATIONS

Industrial Crystallization Operations—New Edition, issued on Jan. 31, 2006, p. 5, Editor: The Society of Separation Process Engineers, Publication Office: The Society of Separation Process Engineers, Japan (with partial English translation).
European Search Report for EP Application No. 10189693.4 dated Apr. 6, 2011 in 4 pages.

*Primary Examiner* — Edward Johnson
(74) *Attorney, Agent, or Firm* — Knobbe, Martens, Olson & Bear LLP (57) ABSTRACT

A crystallization method includes: actually measuring a particle number of the crystals precipitated from the saturated solution and a concentration of the saturated solution, while cooling the solution according to a cooling temperature profile; calculating an absolute particle number of crystals precipitated from the saturated solution according to a mass balance, based on an actual measurement value of the particle number and an actual measurement value of the concentration; heating the saturated solution when the absolute particle number exceeds a threshold to perform heating control so that the absolute particle number becomes a set value; and cooling the saturated solution again according to a preset cooling temperature profile after controlling to dissolve excessive crystals in the solution so that the absolute particle number returns to the set value.

7 Claims, 3 Drawing Sheets

FIG. 4

CRYSTALLIZATION METHOD AND CRYSTALLIZATION APPARATUS

CROSS REFERENCE TO RELATED APPLICATIONS

This application is based upon and claims the benefit of priority from Japanese Patent Application No. 2009-281654, filed Dec. 11, 2009; the entire contents of which are incorporated herein by reference.

BACKGROUND OF THE INVENTION

1. Field of the Invention

The present invention relates to a crystallization method and a crystallization apparatus for generating a crystal products having a narrow particle size distribution width and a predetermined particle size.

2. Description of Related Art

Conventionally, batch cooling crystallization has been performed, in which the temperature of a solution obtained by dissolving a compound (substance to be extracted as crystals) is dropped to thereby precipitate the compound and generate crystals, using as a driving force, a difference between a supersaturated state of the solution caused due to the temperature drop, and the concentration of the saturated compound.

Crystallization means that a particular compound is separated from a liquid phase by precipitating the crystals from the liquid phase.

In cooling crystallization, a cooling temperature profile at the time of cooling a solution is perceived to be important, and as cooling methods having different cooling temperature profiles, a controlled cooling method, a linear cooling method, and a natural cooling method have been devised (for example, refer to Non-Patent Document 1). Among these cooling methods, according to the controlled cooling method, a supersaturation of a saturated solution is maintained low and constant from beginning to end by decreasing the temperature change (slowing down the cooling speed) in an initial stage when an amount of crystals is small, and increasing the temperature change (accelerating the cooling speed) at the time of termination when the amount of crystals increases. Accordingly, secondary nucleation is suppressed, and only monodispersed particles are obtained.

As a general batch cooling crystallizer for performing crystallization process, one having a crystallization tank with an agitator is used. As such a crystallizer, for example, there is disclosed an apparatus that supplies a solution including a seed crystal and a compound into a crystallization tank, and causes an agitator provided in the crystallization tank to perform paddling motion in the figure eight, to thereby generate a slow and large swirling current of the solution in the crystallization tank (for example, refer to Patent Document 1).

[Patent Document 1] Japanese Unexamined Patent Application, First Publication No. 2007-313484

[Non-Patent Document 1] "Industrial Crystallization Operations—New Edition", page 5, issued on Jan. 31, 2006, Editor: The Society of Separation Process Engineers, Japan, Publication office: The Society of Separation Process Engineers, Japan Incidentally, the above-described controlled cooling method is considered to be effective in cooling crystallization using a seed crystal (seeding). However, even if the controlled cooling method is executed, there is not much difference with regard to particle size distribution by weight of a product after finishing crystallization, as compared with a case where a cooling method having other cooling temperature profiles (linear cooling method, natural cooling method) is executed, and the monodispersed particles can not be obtained stably after finishing crystallization.

Moreover, in the crystallizer disclosed in Patent Document 1, because generated crystal particles collide with each other repeatedly due to agitation of the solution in the crystallization tank by the agitator, the crystal particles are disrupted, and the particle size may become different.

In one embodiment, a crystallization method and a crystallization apparatus that can generate monodispersed particles having a narrow particle size distribution width in the cooling crystallization without seed crystals is described. Moreover, a crystallization method and a crystallization apparatus that can generate monodispersed particles having a narrow particle size distribution width, even if nucleation timing of crystal particles is different for each batch are disclosed.

SUMMARY OF THE INVENTION

The crystallization method according to one embodiment is a method in cooling crystallization without seed crystals, in which a solution obtained by dissolving a compound is cooled and crystals of the compound are precipitated from the solution. The crystallization method includes the steps of: actually measuring a particle number of the crystals precipitated from a saturated solution and a concentration of the saturated solution, while cooling the solution according to a cooling temperature profile; calculating an absolute particle number of crystals precipitated from the saturated solution according to a mass balance, based on an actual measurement value of the particle number and an actual measurement value of the concentration; heating the saturated solution when the absolute particle number exceeds a threshold to perform heating control so that the absolute particle number becomes a set value; and cooling the saturated solution again according to a preset cooling temperature profile after controlling to dissolve excessive crystals in the saturated solution so that the absolute particle number returns to the set value.

It is preferable to calculate the set value of the absolute particle number based on; a theoretical amount of crystallization precipitated from the saturated solution according to a temperature difference between a crystallization starting temperature and a crystallization ending temperature, and a set value of desired product particle size of the crystal.

The crystallization apparatus according to one embodiment is an apparatus used for the cooling crystallization without seed crystals, which cools a solution obtained by dissolving a compound therein to precipitate crystals of the compound from the solution. The crystallization apparatus includes: a crystallization tank having a vessel for storing the solution and a device for cooling and/or heating the solution; a particle number measuring device that actually measures a particle number of crystals precipitated from a saturated solution in the crystallization tank and outputs an actual measurement value of the particle number online; and a concentration measuring device that actually measures concentration of the saturated solution in the crystallization tank and outputs an actual measurement value of the concentration online. The crystallization apparatus further includes a temperature control device that performs temperature control for cooling the saturated solution according to a cooling temperature profile, and also; calculates an absolute particle number of crystals precipitated from the saturated solution according to a mass balance, based on an actual measurement value of the particle number output from the particle number measuring device and an actual measurement value of the concentration output from the concentration measuring device, performs heating control of the saturated solution when the absolute particle number exceeds a threshold so that the absolute particle number becomes a set value, and cools the saturated solution again according to a preset cooling temperature profile after dissolving excessive crystals in the saturated solution to return the absolute particle number to the set value.

It is preferable that the crystallization tank includes an agitator that agitates the solution stored in the vessel.

It is preferable that the temperature control device performs control combining temperature control for realizing a preset cooling temperature profile, and heating control for controlling the absolute particle number.

It is preferable that the temperature control device performs control for cooling the solution according to an arbitrary cooling temperature profile including a linear cooling profile, a natural cooling profile, and a controlled cooling profile, after the absolute particle number has reached the set value.

It is preferable that the temperature control device performs heating control of the saturated solution at least once, when the absolute particle number exceeds a threshold.

According to the crystallization method of one embodiment, the absolute particle number of precipitated crystals is calculated during a period from the start of crystallization until the end of crystallization, and when the absolute particle number exceeds a preset threshold, the saturated solution is heated to perform heating control so that the absolute particle number becomes a set value, and excessive crystals are dissolved in the solution to return the absolute particle number to the set value. As compared with a conventional crystallization method in which only cooling is performed, a nucleation period of crystals can be aligned once (internal seeding effect) by heating the saturated solution at least once and using an effect of dissolving crystals generated later. Therefore, the growth time of the entire particles can be approximately equalized. That is, after the absolute particle number has reached the set value after applying a heating operation, crystallization is conducted according to the preset cooling temperature profile, thereby enabling to generate monodispersed crystal particles having a narrow particle size distribution width and aligned particle size. Moreover, cooling thereafter can be changed according to the internal seeding effect, not complying with the preset cooling temperature profile, and crystallization time can be shortened.

Moreover, for a compound having a different nucleation temperature for each batch, the particle number of crystals and the concentration of the solution are actually measured and detected at all times. Because the total particle number of crystals can be accurately corrected according to a mass balance, a difference in particle size distribution between batches can be suppressed by performing heating control so as to realize a theoretical particle number corresponding to a desired particle size.

Furthermore, different from particle size distribution obtained by simple temperature control following the cooling temperature profile, and particle size distribution obtained by temperature control performed by manual operation of an operator relying on his/her experience and intuition, monodispersed particles having a desired particle size can be obtained stably by the present invention.

Moreover, nucleation of crystals is detected, and after the absolute particle number exceeds a threshold, heating control is performed so that the absolute particle number becomes a set value. After the absolute particle number has reached the set value, crystals aligned once grow preferentially in crystallization thereafter. Accordingly, secondary nucleation can be suppressed, and temperature control thereafter according to an arbitrary cooling temperature profile can be realized. That is, after the absolute particle number has reached the set value, the cooling temperature profile can be changed to shorten the crystallization time.

The crystallization apparatus according to one embodiment includes: a particle number measuring device that actually measures a particle number of crystals precipitated from a saturated solution in the crystallization tank and outputs an actual measurement value of the particle number online; and a concentration measuring device that actually measures concentration of the saturated solution in the crystallization tank and outputs an actual measurement value of the concentration online. The crystallization apparatus further includes a temperature control device that performs temperature control for cooling the saturated solution according to a cooling temperature profile, and also; calculates an absolute particle number of crystals precipitated from the saturated solution according to a mass balance, based on an actual measurement value of the particle number output from the particle number measuring device and an actual measurement value of the concentration output from the concentration measuring device, performs heating control of the saturated solution when the absolute particle number exceeds a threshold so that the absolute particle number becomes a set value, and cools the saturated solution again according to a preset cooling temperature profile after dissolving excessive crystals in the saturated solution to return the absolute particle number to the set value.

According to the crystallization apparatus of one embodiment, by heating the saturated solution and using the effect of dissolving crystals generated later, the internal seeding effect in which the nucleation period of crystals is aligned once can be expected, and the growth time of entire particles can be approximately equalized, as compared with the conventional crystallization apparatus that performs only cooling. That is, when the absolute particle number has reached the set value after starting heating control, crystallization is conducted according to the preset cooling temperature profile, thereby enabling to generate monodispersed crystal particles having a narrow particle size distribution width and aligned particle size. Furthermore, after the absolute particle number has reached the set value, cooling thereafter need not follow the preset cooling temperature profile, because the secondary nucleation can be suppressed, due to the internal seeding effect.

Moreover, for a compound having a different nucleation temperature for each batch, the particle number of crystals is actually measured and detected by the particle number measuring device, and the concentration of the solution is actually measured and detected by the concentration measuring device at all times. As a result, because the total particle number of crystals can be accurately corrected according to a mass balance by the temperature control device, a difference in particle size distribution between batches can be suppressed.

Furthermore, different from particle size distribution obtained by the crystallization apparatus that performs simple temperature control following the cooling temperature profile, and particle size distribution obtained by temperature control performed by manual operation of an operator relying on his/her experience and intuition, monodispersed particles having a desired particle size can be obtained stably by the present invention.

Moreover, after the absolute particle number exceeds a threshold due to heating control after having detected nucleation of crystals, heating control is performed by the temperature control device so that the absolute particle number reaches the set value without following the preset cooling temperature profile, and secondary nucleation of crystals can be suppressed by the internal seeding effect, thereby enabling to realize arbitrary temperature control. That is, after the absolute particle number has reached the set value, the previously set cooling temperature profile can be changed to shorten the crystallization time.

DETAILED DESCRIPTION OF THE INVENTION

An embodiment of a crystallization method and a crystallization apparatus of the present invention will be explained.

The embodiment is specifically explained for better understanding of the gist of the invention, and does not limit the scope of the present invention, unless otherwise specified.
[Crystallization Method]

The crystallization method according to one embodiment is a method in which a solution obtained by dissolving a compound is cooled, and crystals of the compound are precipitated from a saturated solution thereof. The crystallization method includes the steps of: actually measuring a particle number of crystals precipitated from a saturated solution and a concentration of the saturated solution, while cooling the solution according to a cooling temperature profile of any one of a linear cooling profile, a natural cooling profile, and a programmed (controlled) cooling profile; calculating an absolute particle number of crystals precipitated from the saturated solution according to a mass balance based on an actual measurement value of the particle number and an actual measurement value of the concentration; performing heating control so that the absolute particle number becomes a set value when the absolute particle number exceeds a threshold; and cooling the saturated solution again according to the cooling temperature profile, after heating the saturated solution and dissolving excessive crystals in the saturated solution to return the absolute particle number to the set value.

In the crystallization method according to one embodiment, at first the target compound is dissolved in a predetermined solvent to prepare a solution of the compound.

The compound to which the present invention is applicable is not particularly limited so long as it is a material dissolvable in a solvent, and even in a state of being dispersed in the solution, can be dissolved again in the solution by increasing temperature. For example, compounds in which solubility largely changes with respect to a change in solution temperature, such as copper sulfate, sodium thio sulfate, nickel sulfate, citric acid, and monosodium glutamate can be mentioned.

The solvent for dissolving the compound is not particularly limited, and it is appropriately selected according to the kind of the compound. Solvents used include one or two kinds or more selected from; water; alcohols such as methanol, ethanol, 2-propanol, butanol, diacetone alcohol, furfuryl alcohol, ethylene glycol, and hexylene glycol; esters such as methyl acetate, ethyl acetate, and n-butyl acetate; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone, acetylacetone, and acetoacetic acid ester; and aromatic hydrocarbons such as toluene and xylene.

Furthermore in one embodiment, an intended compound is dissolved in a predetermined solvent to prepare a solution of the compound so that a saturated solution is obtained at a predetermined crystallization starting temperature. That is, the temperature at the time of preparing the solution (at the time of dissolving the compound in the solvent) need not be the temperature at which the solution becomes a saturated solution, and the solution is prepared so that the saturated solution can be obtained when the solution temperature becomes the predetermined crystallization starting temperature.

Moreover, in one embodiment, the volume of the solution is not particularly limited, and the solution can have a volume in which crystals can be uniformly dispersed in the solution in the crystallization tank by an agitator.

Figure 3:
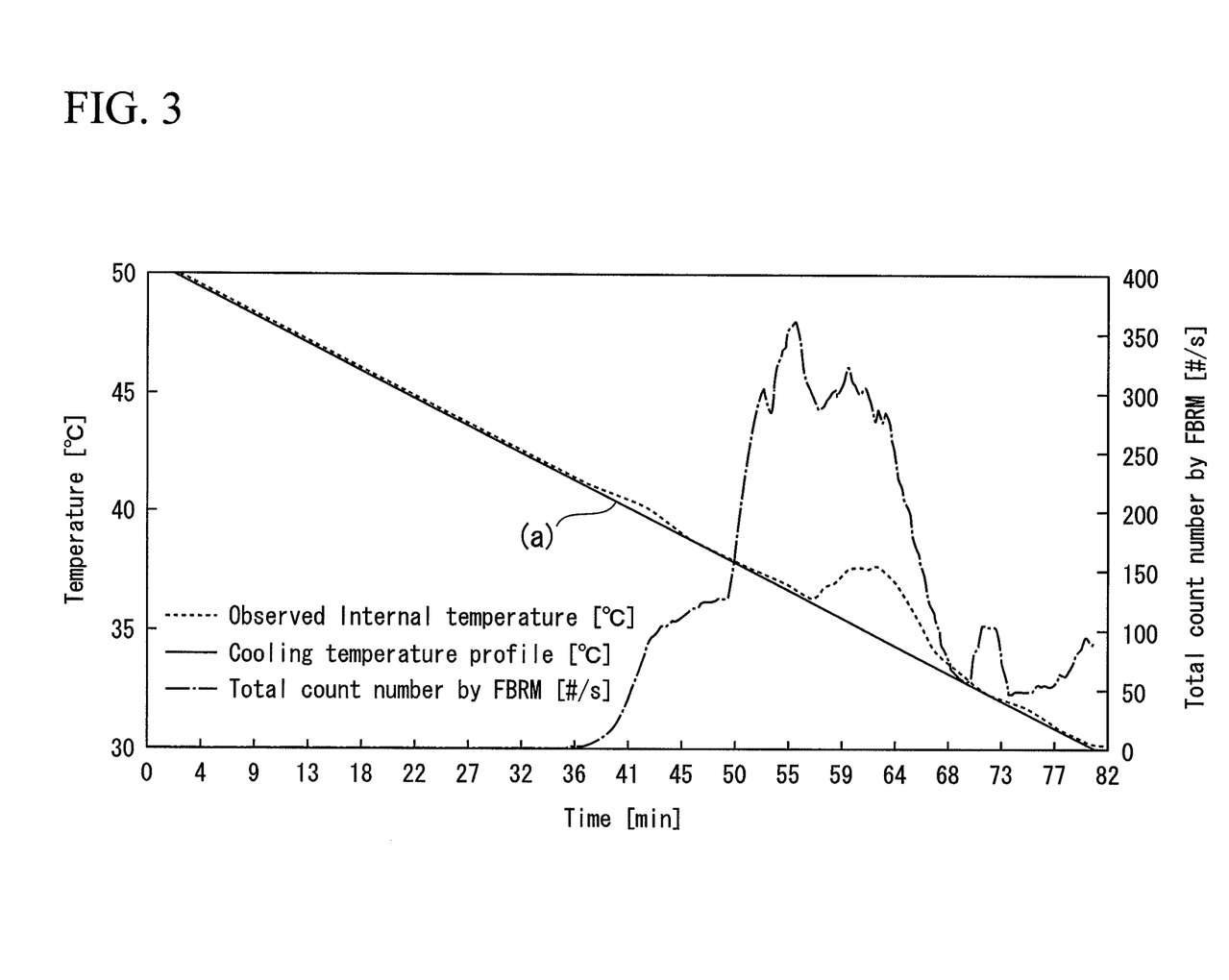
FIG. 3 is a graph showing a cooling temperature profile, measurement values of solution temperature, and measurement results of a total particle number of crystals by FBRM, in the embodiment of the present invention.

Next the solution is cooled according to a cooling temperature profile (the line shown by (a) in FIG. 3) of a linear profile with the inclination being constant as shown in FIG. 3.

In the crystallization method according to one embodiment, crystal nuclei are rapidly generated in a set value (target number) of the absolute particle number of crystals described later, in an initial stage after starting crystallization. Thereafter, heating control is performed so that the absolute particle number reaches the set value at a point in time when a preset threshold of the absolute particle number is exceeded. After the absolute particle number has reached the set value, crystals are caused to grow within the remaining time until the end of crystallization, using these crystals as internal seeding, so that these have a desired product particle size. That is, in one embodiment, after detecting nucleation, the total number of crystals is increased up to an absolute particle number that is more than the set value, that is, up to a threshold, and thereafter, the absolute particle number is made to reach the set value by heating control. The set value of the absolute particle number of crystals remains unchanged (constant) from the start of crystallization until the end of crystallization. The temperature of the saturated solution is then controlled so that the absolute particle number of crystals does not exceed the set value, in a batch period from after the absolute particle number exceeds the threshold until the end of crystallization. Therefore, after finishing the first heating control operation, that is, after the absolute particle number has reached the set value, even if unexpected secondary nucleation occurs due to some disturbance in the crystallization process, heating control is performed again if it is within the crystallization time, and the absolute particle number converges to the set value.

Moreover, the solution is cooled from the start of crystallization until the end of crystallization, and the particle number of crystals precipitated from the saturated solution and the concentration of the saturated solution are actually measured. The absolute particle number of crystals precipitated from the saturated solution is then calculated according to a mass balance based on the measurement value of the particle number of the precipitated crystals and the measurement value of the concentration of the saturated solution. That is, in one embodiment, the particle number of crystals precipitated from the saturated solution and the concentration of the saturated solution are measured at all times from the start of cooling of the solution until the end of cooling, and the absolute particle number of crystals present in the crystallization tank is calculated based on the measurement values using the particle number of crystals and the concentration of the saturated solution.

A particle number measuring device described later is used for measurement of the particle number of crystals precipitated from the saturated solution.

In one embodiment, the particle number of crystals precipitated from the saturated solution is measured by the particle number measuring device, and a precipitated amount (crystallization amount) $W_{part}$ (kg) of crystals obtained from the particle number measuring device is calculated based on the following equation (1).

[Equation 1]

$$W_{part}(t) = \rho_c \alpha_v A \sum_i f_p(i, t) L_{Ri}^3 \qquad (1)$$

In equation (1), $W_{part}$ denotes a precipitated amount (kg) of crystals obtained from the particle number measuring device, $\rho_c$ denotes crystal density (kg/m³) of the precipitated crystals, $\alpha_v$ denotes a particle volume shape factor (–) of the precipitated crystals, A denotes a conversion factor (–) to the absolute particle number, $f_p(i, t)$ denotes the particle number (#) of the precipitated crystals, and $L_{Ri}$ denotes a representative particle size (m) of bin of measuring device. In equation (1), the crystallization amount $W_{part}$ of crystals obtained from the particle number measuring device is expressed as a function, which changes with lapse of time (t) from a point in time of detecting nucleation.

Furthermore, the concentration measuring device described later is used for measurement of the concentration of the solution. However, because the concentration needs to be measured online, a concentration measuring device matched with a substance as a crystallization target needs to be applied. For example, when the crystallization target is an inorganic substance, if a state in which the substance is dissolved in a solution is an electrolyte, a calibration curve between a detected physical amount and the concentration is generated in advance according to correlation between electrical conductivity and solution concentration, and the calibration curve is incorporated in the temperature control device. Moreover, when the crystallization target is an organic substance, a calibration curve between the detected physical amount and the concentration is generated in advance by obtaining correlation between a spectrum unique to the substance and the solution concentration according to infrared spectroscopic analysis (distributed IR, FT-IR), and the calibration curve is incorporated in the temperature control device.

The crystallization amount $W_{conc}$ (kg) of crystals obtained from the concentration measuring device is calculated, using calibration curve and a result obtained by measuring the concentration of the solution based on the following equation (2).

[Equation 2]

$$W_{conc}(t) = V_b \cdot (C_0 - C(t)) \qquad (2)$$

In equation (2), $V_b$ denotes a volume (m³) of the solution used for crystallization, Co denotes a saturated concentration (kg/m³) of the solution before starting crystallization, and C(t) denotes a concentration (kg/m³) of the solution during crystallization. In equation (2), a crystallization amount $W_{conc}$ of crystals obtained from the concentration measuring device is expressed as a function, which changes with lapse of time (t) from a point in time of detecting nucleation.

When agitation of the solution is appropriate, and the particle size distribution included in a condition of a complete mixing flow and a sample volume of the particle number measuring device is equal to the particle size distribution of the entire crystallization tank, the crystallization amount obtained from the particle number measuring device and the crystallization amount obtained from the concentration measuring device are equal for each sampling, that is, the mass balance is equal. Therefore, as shown in the following equation (3), a conversion factor A of the absolute particle number is calculated by using $W_{part}$ and $W_{conc}$ calculated according to the above equations (1) and (2). Because $W_{part}$ and $W_{conc}$ are functions of time, the conversion factor A of the absolute particle number is also expressed as a function of time.

[Equation 3]

$$A = \frac{V_b \cdot (C_0 - C(t))}{\rho_c \cdot \alpha_v \cdot \sum_i (f_p(i, t) \cdot L_{Ri}^3)} \qquad (3)$$

That is $A = W_{conc}/W_{part}$, which expresses a ratio between the total volume of the solution and the sample volume of the particle number measuring device. An absolute particle number $N_{ab}$ (#) of crystals precipitated from the saturated solution is then calculated by using the calculated conversion factor A of the absolute particle number based on the following equation (4). In equation (4), although $N_{fbrm}$ denotes a particle number (#/s) of crystals measured by the particle number measuring device, strictly speaking, a unit of $N_{fbrm}$ is expressed as a number per unit volume and per unit time. However, because equation (3) is calculated for each sampling time, the unit of $N_{fbrm}$ can be considered as (#).

[Equation 4]

$$N_{ab} = A \cdot N_{fbrm} \qquad (4)$$

In one embodiment, an apparatus that applies a particle size measuring method involving measurement of laser backscattered light (focused beam reflectance method (FBRM)) is used as the particle number measuring device.

In the FBRM, when a crystal particle has passed a focal plane of laser beams, backscattering of laser beams occurs when one end of the particle passes the laser beams, and backscattering continues until the other end of the particle passes the laser beams. The particle size (chord length) is calculated based on reflection time of backscattering of the laser beams, and rotation speed of the laser.

According to the particle number measuring device that applies the FBRM, the particle size distribution (the chord length distribution) and particle number of the precipitated crystals can be digitized by inline measurement to enable visual and real-time measurement. Accordingly, a temporal change in the particle number in the saturated solution can be digitized with high accuracy and high sensitivity, by monitoring the particle number in an arbitrarily fractional size on a real-time basis.

The particle number measuring device that applies the FBRM measures the particle size distribution and the particle number in a range reachable by the laser beams. Therefore, the particle number measuring device measures the particle size distribution of crystals present in a solution, which becomes the sample volume of the FBRM probe.

However, as the concentration of the crystals increases with progression of crystallization, the sample volume of the FBRM probe decreases. This is because the range reachable by the laser beams becomes narrow as the concentration of the crystals increases, because the particle number measuring device that applies the FBRM obtains the particle size based on the reflection time of the laser beams reflected by the particles, and the linear speed of the laser beams. Thus, according to the particle size measuring method using the measurement of laser backscattered light, the detection situation of the particle number becomes a function of the crystallization amount, and hence, it cannot be handled as an absolute value of the particle number in an entire area in the crystallization process. Therefore, the measurement of the particle number using the particle number measuring device that applies the FBRM has been conventionally applied only to a case where the absolute value of the particle number is not required and it is desired to detect a tendency of crystallization. For example, application thereof remains in; detection of nucleation based on an increase speed of the particle number of fine particles, confirmation of dissolution of the substance as the crystallization target based on a decrease of the particle number, and measurement of a relative change of a particle size distribution shape of crystals precipitated by crystallization, and the particle number cannot be measured absolutely.

In one embodiment, as described above, the crystallization amount $W_{part}$ (kg) of crystals is calculated based on the above equation (1), and the crystallization amount $W_{conc}$ (kg) of crystals is calculated by applying the concentration of the saturated solution measured by the concentration measuring device to the above equation (2), to calculate the conversion factor A of the absolute particle number by using these calculation results. The crystallization amount $W_{part}$ of crystals and the crystallization amount $W_{conc}$ of crystals calculated here indicate a crystallization amount at one point in time from the start of crystallization, that is, at an arbitrary time from the start of crystallization. Therefore, the conversion factor A of the absolute particle number calculated based on the above equation (3) is a value at an arbitrary time from the start of crystallization.

Moreover, because the particle number measuring device that applies the FBRM measures the particle size distribution and the particle number in the range reachable by the laser beams, the particle size distribution and the particle number cannot be measured over the entire solution.

Therefore, based on the above equation (4), by applying the conversion factor A of the absolute particle number calculated based on the above equation (3), the particle number $N_{fbrm}$ (#/s) of crystals measured by the particle number measuring device that applies the FBRM at an arbitrary time from the start of crystallization is multiplied by the conversion factor A of the absolute particle number to be thereby converted to the absolute particle number $N_{ab}$ (#) of crystals precipitated from the saturated solution.

Furthermore in one embodiment, heating control is performed so that the absolute particle number reaches the set value, from a point in time when the preset threshold of the absolute particle number of crystals is exceeded after start of crystallization, to heat the saturated solution to thereby dissolve the excessive crystals in the solution. After the absolute particle number has reached the set value, control returns to the preset cooling temperature profile to continue cooling crystallization until the end of the crystallization time.

The set value of the absolute particle number of crystals is calculated based on; a theoretical value of the crystallization amount of crystals precipitated from the saturated solution by crystallization, and a set value of the internal seeding particle size $L_s$. More specifically, if $L_p$ is greater than $L_s(L_p \gg L_s)$, a set value $N_s$ of the absolute particle number of crystals is calculated based on a theoretical crystallization amount $W_{th}$ and a targeted product particle size $L_p$ according to the following equation (5).

[Equation 5]

$$\text{Set value of absolute particle number: } N_s = W_{th}/(\rho_c \cdot \alpha_v \cdot L_p^3) \quad (5)$$

After start of crystallization, the absolute particle number $N_{ab}$ is calculated according to the mass balance between the particle number obtained by the FBRM measured online and the concentration obtained by the online concentration measuring device, so that the set value $N_s$ of the absolute particle number of crystals is obtained, to perform temperature control, designating the following equation (6) as a control law.

In the embodiment, P control (proportional control) is applied to a heating control law. However, PID control including a differential action and an integral action can be used according to the compound.

[Equation 6]

$$\text{Heating control law: } \Delta T = \begin{cases} k(N_{ab} - N_s) & \dots N_s < N_{ab} \\ 0 & \dots N_s \geq N_{ab} \end{cases} \quad (6)$$

In the equation (6), $\Delta T$ denotes top-up temperature (° C.) from the preset cooling temperature profile and k denotes a top-up temperature proportional constant (° C./#).

The heating control is performed only by adding the top-up temperature $\Delta T$ to the cooling temperature profile from the start of crystallization until the end of crystallization, in other words, to the temperature control in the crystallization tank, and further, in other words, to a target temperature of internal temperature (solution temperature) control, and can be performed according to the following equation (7).

[Equation 7]

$$\text{Internal temperature set value: } T = T_p(t) + \Delta T \quad (7)$$

In the equation (7), $T_p(t)$ denotes a preset cooling temperature profile.

Moreover, start timing of the heating control is determined according to a threshold $N_{th}$ of the absolute particle number expressed by the following equation (8), in order to ensure a certain particle number in the solution after the end of heating.

[Equation 8]

$$\text{Threshold: } N_{th} = N_s \cdot k_{th} \quad (8)$$

In the equation (8), $N_{th}$ denotes a threshold (#) of the absolute particle number, and $k_{th}$ denotes a threshold coefficient (–) of from 2 to 10.

Thus, by setting the absolute particle number of a value of 2 to 10 times the set value $N_s$ of the absolute particle number as the threshold $N_{th}$, the threshold is set so that even if fine particles are dissolved too much in order to remove an influence of unexpected excessive heating control after starting the heating control, fine particles which become the product, that is, an internal seeding amount remains in the crystallization tank.

Thus, if $N_s<N_{ab}$ after starting the heating control, the heating control is made to function at all times. After starting crystallization, even if unexpected nucleation occurs due to some disturbance other than rapid nucleation which appears initially, if it is within the crystallization time, heating and cooling are performed over and over again, to ensure robustness in operation. On the other hand, if $N_s>N_{ab}$, the heating control is not performed, and temperature control is performed according to the preset cooling temperature profile.

Here the temperature $\Delta T$ for heating the saturated solution by heating control started after the set threshold $N_{th}$ is exceeded after nucleation, is a top-up temperature proportional constant k of a level such that the excessive crystals can be dissolved in the solution. More specifically, the top-up temperature proportional constant k is desired so that the solution temperature is increased to 2° C. to 3° C. higher than the temperature of the saturated solution at a point in time when the absolute particle number of crystals exceeds the set value.

After starting heating control, when a calculated value of the absolute particle number becomes equal to or less than the set value $N_s$, it indicates that the excessive crystals are dissolved in the solution. In this case, $\Delta T=0$ from the above equation (6), and temperature control is performed so as to return to the preset cooling temperature profile.

After the absolute particle number of crystals returns to a value equal to or less than the set value, the saturated solution is cooled again according to the cooling temperature profile, to continue crystallization.

At a point in time when the temperature of the saturated solution has reached the preset crystallization ending temperature, cooling of the saturated solution is finished, to complete cooling crystallization.

As described above, in switching of the heating control function, only the top-up temperature $\Delta T$ need be added to the cooling temperature profile, which is a set value of internal temperature control, and heating control is realized when $\Delta T>0$, and when heating control is not performed, $\Delta T$ needs to be 0 at all times. However, in implementation of the present invention, because particles as an internal seeding amount need to be ensured in the crystallization tank after nucleation, a threshold of the absolute particle number is introduced, and a point in time when the threshold is exceeded is designated as the timing for starting heating control.

According to the crystallization method disclosed, the absolute particle number of the precipitated crystals is calculated all the time from the start of crystallization until the end of crystallization, and from a point in time when the threshold of the absolute particle number is exceeded after nucleation, heating control is performed, setting the absolute particle number as a preset set value. When the absolute particle number exceeds the threshold, the saturated solution is heated by heating control. Then, any excess above the set value of the absolute particle number of crystals present in the saturated solution is dissolved, to return the absolute particle number to the set value or less. As in the conventional manner, the time of crystal nucleation can be aligned once (internal seeding effect) as compared with the crystallization method in which only cooling is performed. Therefore the growth time of the whole particles after being aligned once can be substantially equalized. That is, the internal seeding effect suppresses generation of the secondary nucleation so that only crystals remaining after heating control can grow. Therefore generation of the monodispersed crystal particles with the width of particle size distribution being narrow and the particle size being equalized can be realized. Moreover, because of the internal seeding effect, cooling thereafter need not follow the preset cooling temperature profile, and the crystallization time can be shortened. The crystal nucleation timing in the cooling crystallization is a point in time when the absolute particle number of crystals clearly exceeds the absolute particle number at the time of dissolution (that is, because particulate impurities are mixed in the solution in the process of the operation, and the particulate dust is also measured, the absolute particle number does not become 0, and has a certain minimum value).

Moreover, also for a compound in which the nucleation temperature is different for each batch, that is, even in the case of a compound susceptible to the influence of impurities, the particle number of the crystals and the concentration of the saturated solution can be actually measured all the time, and the absolute particle number of crystals can be accurately detected according to the mass balance. Therefore a difference in the particle size distribution for each batch can be suppressed by setting a particle number corresponding to the particle size of a desired product as a set value of the heating control.

Furthermore, different from particle size distribution obtained by simple temperature control following the cooling temperature profile, and particle size distribution obtained by temperature control relying on experience and intuition of an operator by manual operation, monodispersed particles having a desired particle size can be obtained stably.

Moreover, after detection of crystal nucleation, the absolute particle number has reached the set value by the heating control after the absolute particle number of crystals exceeds the threshold. After the absolute particle number has reached the set value, the secondary nucleation can be suppressed in crystallization thereafter due to the internal seeding effect. Therefore, arbitrary temperature control can be realized. That is, after the absolute particle number has reached the set value by the heating control, an operation is also possible where the cooling temperature profile is changed to shorten the crystallization time.

[Crystallization Apparatus]

Figure 1:
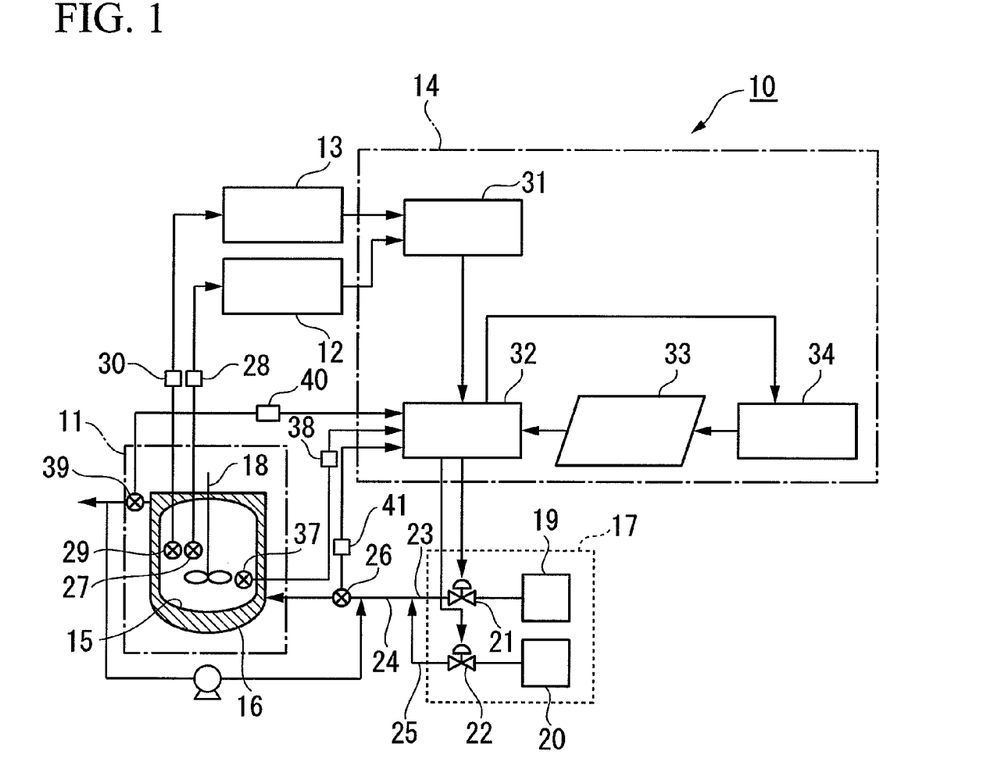
FIG. 1 is a schematic block diagram showing an embodiment of a crystallization apparatus of the present invention.
Figure 2:
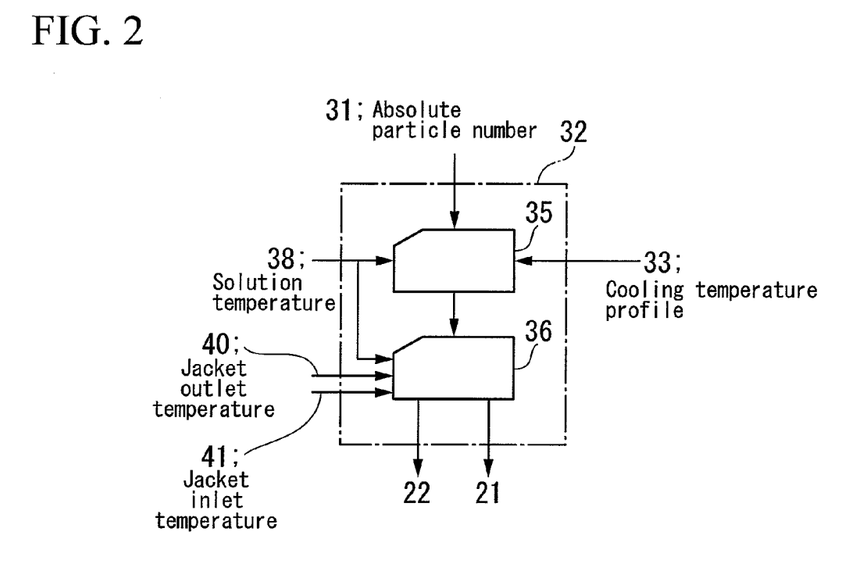
FIG. 2 is a schematic block diagram showing a temperature controller (temperature control device) constituting the crystallization apparatus of the present invention.

FIG. 1 is a schematic block diagram showing an embodiment of the crystallization apparatus of the present invention. FIG. 2 is a schematic block diagram showing a temperature controller (temperature control device) constituting the crystallization apparatus of the present invention.

A crystallization apparatus 10 in the embodiment includes; a crystallization tank 11, a particle number measuring device 12, a concentration measuring device 13, and a temperature control device 14.

The crystallization tank 11 includes; a vessel 15 that stores a solution including a compound as a crystallization target, a jacket 16 provided to cover an outer circumference of the vessel 15, a cooling/heating device 17 that cools and/or heats the solution stored in the vessel 15, and an agitator 18 that agitates the solution stored in the vessel 15.

The volume of the vessel 15 is not particularly limited so long as complete mixing is satisfied as a flow state in the crystallization tank, and the size, shape, and number of rotations of the agitator are appropriately adjusted according to the amount of solution stored therein. However, a size such that temperature control of the solution by the cooling/heating device 17 is easy, and a detecting sensor in each measuring instrument can be inserted from an upper part of the crystallization tank 11 is desirable. Specifically, the volume of the vessel 15 is preferably 500 mL or more.

When the volume of the vessel 15 exceeds, for example, 5000 L, agitation by the agitator 18 becomes nonuniform, thereby causing a local difference in the particle size distribution in the solution. Therefore, large particles tend to sink to the bottom of the vessel 15, and as a result, crystals having an intended particle size distribution are difficult to generate because of the over estimate of conversion factor A.

The jacket 16 has a space for holding a heating/cooling fluid between the vessel 15 and the jacket 16. Heating and heat removal in the vessel 15 is performed by using a temperature difference between the heating/cooling fluid in the jacket 16 and an inside of the vessel 15, to adjust the temperature in the vessel 15.

The cooling/heating device 17 is for supplying cooling water as a refrigerant or steam as a heating medium to the space in the jacket 16, and includes a cooling water supply source 19 that supplies cooling water, and a steam supply source 20 that supplies steam. The refrigerant to be used for the cooling water supply source 19 can be any medium except water, and the heating medium to be used for the steam supply source 20 need not be a gas, and can be a heating medium of a substance the same as the refrigerant.

The cooling water supply source 19 is connected to the jacket 16 via a cooling water supply tube 23 including a valve 21 halfway thereof and a supply tube 24 connected to the cooling water supply tube 23.

The steam supply source 20 is connected to the jacket 16 via a steam supply tube 25 including a valve 22 halfway thereof and the supply tube 24 connected to the steam supply tube 25.

Halfway along the supply tube 24, a temperature measuring sensor 26 that measures the temperature of the medium to be supplied to the jacket is provided.

Moreover supply of the cooling water from the cooling water supply source 19 to the jacket 16, and supply of steam from the steam supply source 20 to the jacket 16 are selected by a temperature controller 32 in the temperature control device 14. That is, an opening of the valve 21 is controlled by the temperature controller 32, thereby adjusting a supply amount of the cooling water into the jacket 16. Moreover, an opening of the valve 22 is controlled by the temperature controller 32, thereby adjusting a supply amount of the steam into the jacket 16. The steam is condensed to liquid instantly upon being mixed with water. Furthermore the temperature controller 32 is constituted by cascade control of model predictive control including a process model in which a heat transfer process in the crystallization tank 11 is formulated. The temperature controller 32 constitutes an internal model of the model predictive control to control the temperature in the vessel 15 without any delay in the preset cooling temperature profile, taking into consideration a time constant of the first-order system from the jacket 16 to the vessel 15, dead time, and also the time constant and the dead time of the first-order system for a mixing process of the heating/cooling fluid. Furthermore in order to realize heating control during the cooling crystallization, the internal temperature is controlled by using the above equation (7), which top-up $\Delta T$ calculated according to the heating control law in the above equation (6) to the preset cooling temperature profile.

Heat transfer occurs between the medium supplied to the jacket 16 and the solution in the vessel 15, and the solution temperature in the vessel 15 is controlled to a predetermined temperature $T_s$.

In order to control the solution temperature in the vessel 15 to the predetermined temperature, the valves 21 and 22 are opened or closed exclusively by the temperature controller 32 to supply the cooling water and the steam separately into the jacket 16.

The agitator 18 is provided to make uniform the solution in the vessel 15 and the temperature distribution thereof.

An agitation rate of the solution by the agitator 18 is not particularly limited. However, the agitation rate is preferably such that the crystals are uniformly distributed in the vessel 15 without collapsing the precipitated crystals, and crystal growth is not inhibited.

The particle number measuring device 12 applies the FBRM as described above, and actually measures the particle number of the crystals precipitated from the saturated solution in the vessel 15 of the crystallization tank 11 in order to observe the degree of progress of crystallization, and outputs online the measurement value of the particle number to a particle number converter 31 in the temperature control device 14. Moreover, the particle number measuring device 12 is constituted by a light irradiating section that irradiates laser beams into the solution, and a light receiving section that receives reflected light from the crystals, in order to measure the particle size distribution and the particle number of crystals in the solution, and includes a converter 28 having a light irradiating/receiving section 27 arranged in the vessel 15.

The concentration measuring device 13 applies the solution concentration measuring method described above, and in order to detect the degree of progress of crystallization, actually measures the concentration of the solution in the vessel 15 of the crystallization tank 11, and outputs online the measurement value of the concentration to the particle number converter 31 in the temperature control device 14. Moreover, in order to measure the concentration of the solution, the concentration measuring device 13 includes a converter 30 having a detecting sensor 29 arranged in the vessel 15.

The temperature control device 14 includes the particle number converter 31, the temperature controller 32 constituted by the model predictive control, a cooling temperature profile generator 33, and a display/operating device 34.

The particle number converter 31 is connected to the particle number measuring device 12 and the concentration measuring device 13, and sequentially calculates a conversion factor A in a crystallization process according to the above equation (3) based on the measurement value of the particle number of crystals precipitated in the saturated solution in the vessel 15, output from the particle number measuring device 12, and the measurement value of the concentration of the saturated solution in the vessel 15, output from the concentration measuring device 13. Moreover, the particle number converter 31 sequentially calculates the absolute particle number of crystals precipitated in the saturated solution in the vessel 15, and outputs the absolute particle number to the temperature controller 32.

The temperature controller 32 is constituted by a primary controller 35 and a secondary controller 36 involving the model predictive control connected to a cascade of the internal temperature control in the vessel 15 and the jacket inlet temperature control in the jacket 16.

The primary controller 35 is incorporated in the temperature control device 14, and is connected to a temperature measurement detector (resistance temperature detector) 37 that measures the solution temperature in the vessel 15 and a converter 38 thereof. The cooling temperature profile generator 33 is also connected to the primary controller 35. The cooling temperature profile generator 33 can select any one of; controlled cooling method, linear cooling method, and natural cooling method, or can select a certain temperature as the cooling temperature profile.

The converter 38 of the internal temperature in the vessel 15 is connected to the secondary controller 36. A converter 40 having a temperature measuring sensor 39 that measures the temperature of the medium discharged from the jacket 16 (outlet temperature of the jacket 16) is also connected to the secondary controller 36. Moreover, a converter 41 having a temperature measuring sensor 26 that measures the temperature of the cooling water or the steam to be supplied to the space in the jacket 16 (inlet temperature of the jacket 16) is connected to the secondary controller 36. The temperatures output from the converters 38, 40, and 41 become inputs of the internal model in the model predictive control, and the model predictive control calculates the valve opening of the cooling water supply valve 21 and the steam supply valve 22 based on these input values. In order to realize more strict temperature control, respective temperatures supplied from the cooling water supply source 19 and the steam supply source 20 are measured and added to the inputs of the internal model of the model predictive control.

The primary controller 35 outputs a set value of the inlet temperature of the jacket 16 to the secondary controller 36, taking into consideration the time constant of the first-order system from the jacket 16 to the vessel 15 and dead time, based on a deviation between a set value of the solution temperature in the vessel 15, and the solution temperature in the vessel 15 input from the converter 37, designating the cooling temperature profile input from the display/operating device 34 (the above-described cooling temperature profile) as the set value. Moreover, when the absolute particle number input from the particle number converter 31 exceeds the threshold, the primary controller 35 constituting the model predictive control outputs a set value of the inlet temperature of the jacket 16 to the secondary controller 36, so as to heat the saturated solution in the vessel 15, designating a cooling temperature profile, in which the top-up temperature $\Delta T$ from the cooling temperature profile calculated by the heating control law is added, as a new set value shown in the above equation (7).

The secondary controller 36 constitutes cascade control together with the primary controller 35. The secondary controller 36 adjusts the inlet temperature of the jacket by controlling the opening of the valve 21 for supplying the cooling water into the jacket 16 from the cooling water supply source 19 and/or the opening of the valve 22 for supplying the steam into the jacket 16 from the steam supply source 20, so that the solution temperature in the vessel 15 decreases according to the cooling temperature profile input from the display/operating device 34, based on; the set value of the inlet temperature of the jacket input from the primary controller 35, the solution temperature in the vessel 15 input from the converter 38, the inlet temperature of the jacket 16 input from the converter 41, and the outlet temperature of the jacket input from the converter 40, in order to control the inlet temperature of the jacket 16.

The display/operating device 34 performs operations such as input to the cooling temperature profile generator 33 of: a predetermined cooling temperature profile, a theoretical precipitation amount $W_{th}$, a set value $N_s$ of the absolute particle number of crystals, and a threshold $N_{th}$ of the condition of starting the heating control, a threshold coefficient $k_{th}$, and a top-up temperature proportional constant k of the heating control law as heating control start conditions, and can display the cooling temperature profile, a temperature change of the solution in the vessel 15 during crystallization, a total particle number of precipitated crystals, the internal temperature set value, and the top-up temperature. As such a display/operating device 34, a control computer or a general personal computer can be used.

Operation of the crystallization apparatus 10 is explained by explaining the crystallization method using the crystallization apparatus 10.

First, to prepare a saturated solution at an arbitrary temperature, a predetermined amount of solvent and a predetermined amount of compound that dissolves in the solvent at the temperature are charged into the vessel 15.

The solvent and the compound in the vessel 15 are agitated and mixed by the agitator 18, and a set value of the inlet temperature of the jacket 16 such that the internal temperature of the solution in the vessel 15 becomes the set value, is output from the primary controller 35 to the secondary controller 36. The opening of the valve 21 for supplying the cooling water into the jacket 16 from the cooling water supply source 19 and/or the opening of the valve 22 for supplying the steam into the jacket 16 from the steam supply source 20 are then controlled by the secondary controller 36 so as to heat the solution in the vessel 15, according to; the set value of the inlet temperature of the jacket 16, the solution temperature in the vessel 15 input from the detector 38, the inlet temperature of the jacket 16 input from the detector 41, and the outlet temperature of the jacket 16 input from the detector 40.

Accordingly, the solvent and the compound are heated to dissolve the compound in the solvent, to thereby prepare a solution containing the compound.

At the time of preparation of the solution, the target temperature of the internal temperature for heating the solvent and the compound is not particularly limited. However, the target temperature is set higher than the temperature of the saturated solution by about 5° C. so that crystals of the compound do not remain in the obtained solution, and a target temperature higher than the temperature of the saturated solution by 10° C. or more can be set in order to shorten dissolution time.

The solution after preparation need not be a saturated solution, and cooling water is supplied from the cooling water supply source 19 to the jacket 16 and the solution is cooled to a predetermined temperature, so that the solution becomes a saturated solution at the time of starting crystallization.

Then for a certain time after the solution temperature has reached the temperature to start crystallization, the solution temperature is kept at the temperature, or crystallization is started immediately. The temperature controller 32 controls the opening of the valve 21 for supplying the cooling water into the jacket 16 from the cooling water supply source 19 and/or the opening of the valve 22 for supplying the steam into the jacket 16 from the steam supply source 20 so as to cool the solution, according to the cooling temperature profile input from the display/operating device 34 in advance (the above-described linear temperature profile), and crystallization proceeds.

Before starting crystallization, the display/operating device 34 sets the cooling temperature profile, and inputs the predetermined cooling temperature profile, the theoretical crystallization amount, the set value of the absolute particle number of crystals, the threshold coefficient for starting heating control, and the top-up temperature proportional constant in the heating control.

During execution of crystallization, the particle number of crystals precipitated in the vessel 15 is measured by the particle number measuring device 12, the concentration of the saturated solution in the vessel 15 is measured by the concentration measuring device 13, and the particle number converter 31 calculates the absolute particle number of the precipitated crystals based on the measurement results.

When a calculated value of the absolute particle number of crystals calculated by the particle number converter 31 exceeds the above-described threshold, heating control of the absolute particle number is started, that is, the top-up temperature is added to the cooling temperature profile, and the primary controller 35 outputs a set value of the inlet temperature of the jacket 16 to the secondary controller 36 so as to heat the saturated solution in the vessel 15, designating the temperature as a set value. The secondary controller 36 then controls the opening of the valve 21 for supplying the cooling water into the jacket 16 from the cooling water supply source 19 and/or the opening of the valve 22 for supplying the steam into the jacket 16 from the steam supply source 20 so as to heat the saturated solution in the vessel 15, according to; the set value of the inlet temperature of the jacket 16, the temperature of the saturated solution in the vessel 15 input from the converter 38, the inlet temperature of the jacket 16 input from the converter 41, and the outlet temperature of the jacket 16 input from the converter 40. More specifically, the secondary controller 36 starts heating control when the absolute particle number of crystals exceeds the set value, and controls the opening of the valve 21 for supplying the cooling water into the jacket 16 from the cooling water supply source 19 and/or the opening of the valve 22 for supplying the steam into the jacket 16 from the steam supply source 20 so as to achieve the set value of the absolute particle number of crystals. Accordingly, excessive crystals are dissolved in the solution in the vessel 15, to return the absolute particle number to the set value.

Then after the calculated value of the absolute particle number of crystals calculated by the particle number converter 31 returns to the set value, the primary controller 35 outputs the set value of the inlet temperature of the jacket 16 to the secondary controller 36 again so as to cool the solution in the vessel 15. Moreover, the secondary controller 36 controls the opening of the valve 21 for supplying the cooling water into the jacket 16 from the cooling water supply source 19 and/or the opening of the valve 22 for supplying the steam into the jacket 16 from the steam supply source 20 so as to cool the solution in the vessel 15, according to; the set value of the inlet temperature of the jacket 16, the temperature of the solution in the vessel 15 input from the converter 38, the inlet temperature of the jacket 16 input from the converter 41, and the outlet temperature of the jacket 16 input from the converter 40. The secondary controller 36 then cools the solution according to the above-described cooling temperature profile, to continue crystallization.

At a point in time when the temperature of the saturated solution has reached the preset crystallization ending temperature, cooling of the saturated solution is finished, and the temperature control device 14 finishes the temperature control following the cooling temperature profile, and holds the final temperature of the cooling temperature profile, to thereby finish crystallization.

The crystallization apparatus 10 according to the embodiment includes; the particle number measuring device 12 that actually measures the particle number of crystals precipitated from the saturated solution in the crystallization tank 11 and outputs online the measurement value of the particle number, the concentration measuring device 13 that actually measures the concentration of the saturated solution in the crystallization tank 11 and outputs online the measurement value of the concentration, and the temperature control device 14 that performs temperature control to cool the solution according to the cooling temperature profile, and also calculates the absolute particle number of crystals precipitated from the saturated solution based on the measurement value of the particle number output from the particle number measuring device 12 and the measurement value of the concentration output from the concentration measuring device 13, and performs temperature control such that when the absolute particle number exceeds the preset set value, the saturated solution is heated to dissolve the excess of the crystals in the solution, and after the absolute particle number returns to the set value, the solution is cooled again according to the cooling temperature profile. According to the crystallization apparatus 10, the nucleation period of crystals can be aligned once (internal seeding effect) as compared with the conventional crystallization apparatus that performs only cooling, and hence, the growth time of the whole particles can be substantially equalized. That is, by applying a heating operation equivalent to the internal seeding effect, generation of monodispersed crystal particles having a narrow particle size distribution width and aligned particle size can be realized.

Moreover, for a compound having a different nucleation temperature for each batch, that is, for a compound susceptible to the influence of impurities and dust, the particle number of crystals is actually measured and detected all the time by the particle number measuring device 12, and the concentration of the saturated solution is actually measured and detected all the time by the concentration measuring device 13. Therefore, because the temperature control device 14 can accurately detect the total particle number of crystals, a difference in particle size distribution between batches can be suppressed by executing temperature control so that the absolute particle number of crystals can reach the set value, by the subsequent heating control.

Moreover, by introducing feedback control for controlling the absolute particle number in the cooling crystallization process, monodispersed particles having a desired particle size can be obtained stably, different from particle size distribution obtained by a crystallization apparatus that performs simple temperature control following the cooling temperature profile, or particle size distribution obtained by temperature control performed by manual operation of an operator relying on his/her experience and intuition.

Furthermore, after the absolute particle number has reached the set value by the heating control using the temperature control device 14 after the absolute particle number of crystals exceeds the threshold, after detection of crystal nucleation, secondary nucleation of crystals can be suppressed without following the preset cooling temperature profile, and hence, arbitrary temperature control can be realized. That is, after the absolute particle number reaches the set value, the cooling temperature profile can be changed to shorten the crystallization time.

EXAMPLES

The present invention will be explained more specifically by an example and a comparative example. However, the present invention is not limited to the following examples.

Example

By using a crystallization apparatus as shown in FIG. 1, crystallization of potassium alum (potassium aluminum sulphate-12-hydrate, AlK $(SO_4)_2 \cdot 12H_2O$) was performed.

As a vessel of the crystallization tank, one having a volume of 500 mL was used, and the water ($H_2O$) was used as a solvent.

In the vessel of the crystallization tank, potassium alum was weighed and dissolved in the solvent so as to obtain a saturated solution of 50° C. The internal temperature of the vessel was then adjusted to 55° C., and the solution was left until the potassium alum was completely dissolved, to thereby prepare a potassium alum saturated solution at 50° C.

The potassium alum saturated solution was then cooled from 50° C. to 30° C. according to a linear cooling temperature profile over 80 minutes, and after nucleation was detected, heating and cooling were performed, to generate crystals of potassium alum.

The particle number of crystals precipitated from the saturated solution in the crystallization tank was actually measured by a particle number measuring device from the start of crystallization until the end of crystallization, and a measurement value of the particle number was output online to a temperature control device. Concentration of the saturated solution in the crystallization tank was then actually measured by a concentration measuring device from the start of crystallization until the end of crystallization, and a measurement value of the concentration was output online to the temperature control device. The temperature control device calculated online an absolute particle number of crystals precipitated from the saturated solution by obtaining an absolute particle number conversion factor based on the measurement value of the particle number and the measurement value of the concentration.

The saturated solution was cooled according to the linear cooling temperature profile after nucleation was detected from the start of crystallization until the absolute particle number of crystals reached a threshold, which was three times as large as a preset set value, and from a point in time when the absolute particle number of crystals exceeded the threshold, heating control was started. Here a top-up temperature proportional constant was set such that solution temperature became higher by 3° C. than the temperature of the saturated solution at a point in time when the absolute particle number of crystals had exceeded the threshold.

A desired product size of the crystal was set to 200 µm, a theoretical crystallization amount was set to 88.5 g, a set value of the absolute particle number was set to $6.3 \times 10^9$, and the threshold of the absolute particle number of crystals was set to $1.89 \times 10^{10}$, which was 100 (#/s) based on a total particle number from the particle number measuring device. Moreover, an absolute particle number conversion factor A was sequentially calculated according to the total particle number and concentration by a particle number converter, and used as the absolute particle number of crystals.

When the total particle number reached the above-described total particle number, heating control was started, designating a temperature obtained by adding a top-up temperature to the cooling temperature profile as a target of the internal temperature, and temperature control was executed until the end of crystallization.

Crystals of potassium alum were generated according to the above-described manner.

The cooling temperature profile, the measurement value of the solution temperature, and the measurement result of the total particle number of crystals according to FBRM in example 1 are shown in FIG. 3. In FIG. 3, the internal temperature coincides with the preset cooling temperature profile until a heat generation reaction occurs immediately after nucleation. Heating control shown by the above equations (6) and (7) was performed from a point in time when the total count number involving the FBRM exceeded 100 (#/s), that is, the threshold was exceeded. Model predictive control shows the good desirable temperature control on the internal temperature, heating control and then the internal temperature returns to the preset cooling profile. But using PID temperature control in which the internal temperature coincides with the cooling temperature profile cannot be realized, because PID control is susceptible to the influence of a time constant and dead time of the first-order system of the heat transfer process.

Figure 4:
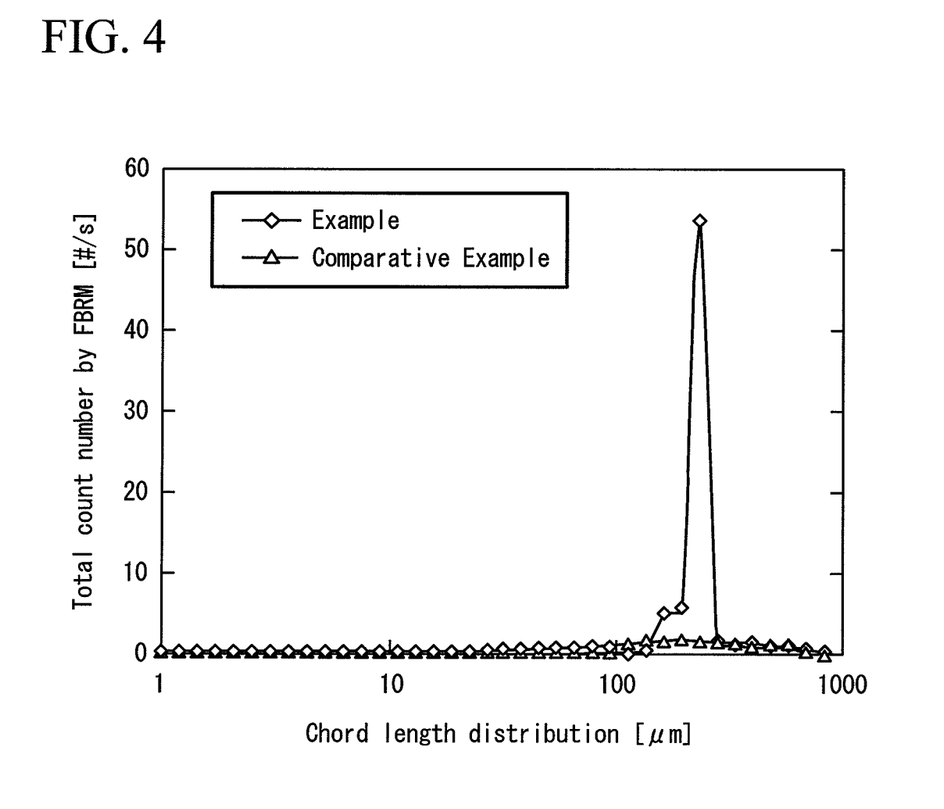
FIG. 4 is a graph showing a measurement result of chord length distribution of crystals by FBRM obtained by the embodiment and a comparative example of the present invention.

A comparative example using a particle size distribution involving the FBRM, of crystals obtained by the example, and is shown in FIG. 4.

Comparative Example

By using a crystallization apparatus as shown in FIG. 1, crystallization of potassium alum (potassium aluminum sulphate-12-hydrate, $AlK(SO_4)_2 \cdot 12H_2O$) was performed.

As a vessel of a crystallization tank, one having a volume of 500 mL was used, and the water ($H_2O$) was used as a solvent.

In the vessel of the crystallization tank, potassium alum was weighed and dissolved in the solvent so as to obtain a saturated solution of 50° C. The internal temperature of the vessel was then adjusted to 55° C., and the solution was left until the potassium alum was completely dissolved, to thereby prepare a potassium alum saturated solution at 50° C.

The potassium alum saturated solution was then cooled from 50° C. to 30° C. according to a linear cooling temperature profile over 80 minutes from start of crystallization until end of crystallization without performing heating and cooling after nucleation detection, to generate crystals of potassium alum.

The particle size distribution of the obtained crystals by normal linear cooling was measured. The result is shown in FIG. 4.

[Results]

In FIG. 4, a measurement value of the total particle number of the FBRM per unit time is plotted on the Y axis, and logarithmic particle size distribution is plotted on the X axis.

From the results shown in FIG. 4, in the example, because the potassium alum saturated solution was cooled according to the linear temperature profile, and the saturated solution was heated after the absolute particle number of crystals exceeded the threshold, there was a sharp peak value in a particle size of 234 µm, and a measurement value of the total particle number of the peak the FBRM at that time was 54 (#/s). Accordingly, it was confirmed that the monodispersed particles were obtained as an effect of the present invention.

On the other hand, in the comparative example, because the potassium alum saturated solution was simply cooled according to the linear cooling temperature profile, there was a weak peak value in a particle size of 195 µm, and a measurement value of the total particle number of the peak the FBRM at that time was only 1.5 (#/s), and the particle size distribution was broad.

As is obvious from the above results, by adding heating control so that the set value of the absolute particle number calculated based on a desired product size is satisfied, and executing temperature control to heat the saturated solution after the absolute particle number of crystals exceeds the threshold, monodispersed particles can be obtained, and it is confirmed that the average product particle size increases.

A preferred embodiment of the present invention has been explained above. However the present invention is not limited to the above-described embodiment. Additions, omissions, replacement, and other modifications of the configuration are possible within a range without departing from the scope of the present invention. The present invention is not limited by the explanation described above, and is only limited by the scope of the appended claims.

What is claimed is:

1. A crystallization method in cooling crystallization without seed crystals, the method comprising:
   measuring a particle number of crystals precipitated from a saturated solution and a concentration of the saturated solution, and cooling the solution according to a first cooling temperature profile;
   calculating an absolute particle number of crystals precipitated from the saturated solution according to a mass balance, based on the particle number and the concentration;
   heating the saturated solution when the absolute particle number exceeds a threshold so that the absolute particle number becomes a set value; and
   cooling the saturated solution according to a preset second cooling temperature profile after dissolving excessive crystals in the saturated solution so that the absolute particle number returns to the set value.

2. A crystallization method according to claim 1, wherein the set value of the absolute particle number is calculated based on; a theoretical amount of crystallization precipitated from the saturated solution according to a temperature difference between a crystallization starting temperature and a crystallization ending temperature, and a set value of a desired product particle size of the crystal.

3. A crystallization apparatus used for cooling crystallization without seed crystals comprising:
   a crystallization tank comprising a vessel for storing a solution and a device configured to cool or heat the solution;
   a particle number measuring device configured to measure a particle number of crystals precipitated from a saturated solution in the crystallization tank and output an actual measurement value of the particle number online;
   a concentration measuring device configured to measure a concentration of the saturated solution in the crystallization tank and output an actual measurement value of the concentration online; and
   a temperature control device configured to:
      cool the saturated solution according to a first cooling temperature profile, and calculate an absolute particle number of crystals precipitated from the saturated solution according to a mass balance based on the particle number measured by the particle number measuring device and concentration measured by the concentration measuring device,
      control the heating of the saturated solution when the absolute particle number exceeds a threshold so that the absolute particle number becomes a set value, and
      cool the saturated solution according to a second preset cooling temperature profile after dissolving excessive crystals in the saturated solution to return the absolute particle number to the set value.

4. A crystallization apparatus according to claim 3, further comprising an agitator that agitates the solution in the vessel.

5. A crystallization apparatus according to claim 3, wherein the temperature control device is configured to determine the second preset cooling temperature profile, and control the heat for controlling the absolute particle number.

6. A crystallization apparatus according to claim 3, wherein the temperature control device is configured to cool the solution according to a first cooling temperature profile selected from the group consisting of a linear cooling profile, a natural cooling profile, and a controlled cooling profile, after the absolute particle number has reached the set value.

7. A crystallization apparatus according to claim 3, wherein the temperature control device is configured to control the heating of the saturated solution at least once, when the absolute particle number exceeds a threshold.

* * * * *